(12) United States Patent
Jauss et al.

(10) Patent No.: US 12,388,126 B2
(45) Date of Patent: Aug. 12, 2025

(54) DEVICE FOR THE FILLING AND MAINTENANCE OF A SYSTEM WITH A BATTERY

(71) Applicant: Mahle International GmbH, Stuttgart (DE)

(72) Inventors: Stefan Jauss, Donzdorf (DE); Nic Sautter, Plochingen (DE)

(73) Assignee: Mahle International GmbH (DE)

(\*) Notice: Subject to any disclaimer, the term of this patent is extended or adjusted under 35 U.S.C. 154(b) by 511 days.

(21) Appl. No.: 17/951,089

(22) Filed: Sep. 22, 2022

(65) Prior Publication Data

US 2023/0090139 A1 Mar. 23, 2023

(30) Foreign Application Priority Data

Sep. 23, 2021 (DE) .......................... 102021210585.8

(51) Int. Cl.
*H01M 10/61* (2014.01)
*B60H 1/00* (2006.01)
*H01M 10/42* (2006.01)
*H01M 10/613* (2014.01)
*H01M 10/625* (2014.01)
(Continued)

(52) U.S. Cl.
CPC ...... *H01M 10/613* (2015.04); *B60H 1/00278* (2013.01); *H01M 10/4228* (2013.01); *H01M 10/625* (2015.04); *H01M 10/63* (2015.04); *H01M 10/6568* (2015.04); *B60L 58/26* (2019.02); *H01M 2220/20* (2013.01)

(58) Field of Classification Search
CPC .. H01M 10/613; H01M 10/625; H01M 10/63; H01M 10/6568; H01M 10/4228; H01M 2220/20; B60H 1/00278; B60L 58/26
See application file for complete search history.

(56) References Cited

U.S. PATENT DOCUMENTS 6,193,895 B1 2/2001 Dea
11,541,719 B1\* 1/2023 Richardson ............ B60H 1/004
(Continued)

FOREIGN PATENT DOCUMENTS

CN 104807262 A 7/2015
DE 102018205090 B3 7/2019
DE 102018216837 A1 10/2019

OTHER PUBLICATIONS

English abstract for DE-102018216837.
(Continued)

*Primary Examiner* — Raymond Alejandro
(74) *Attorney, Agent, or Firm* — Fishman Stewart PLLC

(57) ABSTRACT

A device for filling and maintenance of a system with a battery that is cooled by a coolant is disclosed. The device includes a control arrangement that, for a first filling of the system with the coolant: checks a system path for leakages via a leakage-checking arrangement; in the absence of leakage, fills the system with coolant via a coolant reservoir; flushes the system with coolant such that the coolant circulates along the system path through the system and the device; checks a quality of the coolant via an analysis arrangement during flushing, and cleans the coolant via a cleaning arrangement; and completes the first filling when the quality lies above a predetermined value range.

20 Claims, 1 Drawing Sheet

(51) Int. Cl.
*H01M 10/63* (2014.01)
*H01M 10/6568* (2014.01)
*B60L 58/26* (2019.01)

(56) References Cited

U.S. PATENT DOCUMENTS

2022/0009310 A1* 1/2022 Ohara ................ B60H 1/00278
2022/0074337 A1* 3/2022 Ariyama ................ B60K 1/00

OTHER PUBLICATIONS

English abstract CN-104807262.
English abstract for DE-102018205090.
German Search Report for DE-102021210585.8, dated Jun. 3, 2022.

* cited by examiner

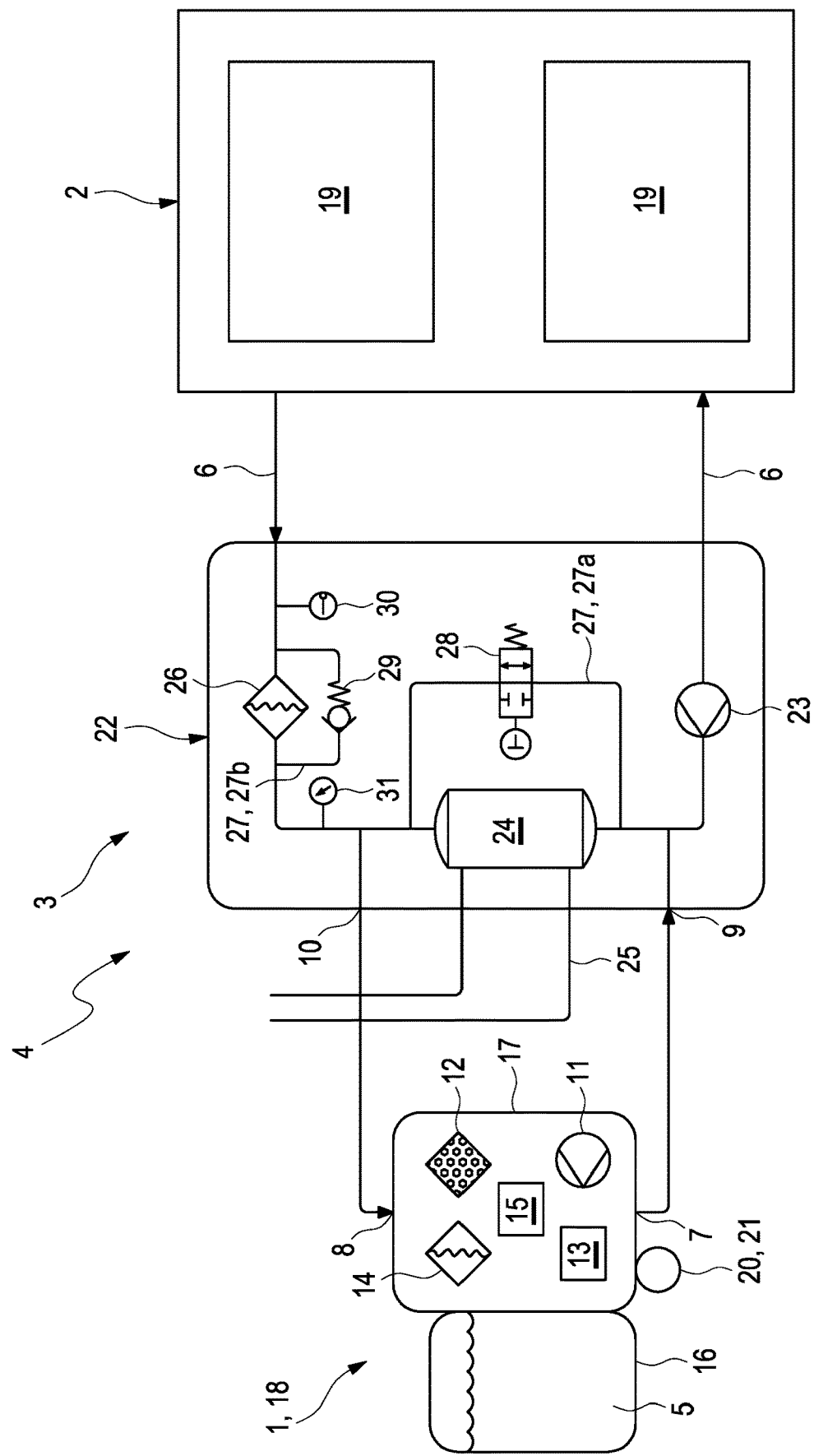

DEVICE FOR THE FILLING AND MAINTENANCE OF A SYSTEM WITH A BATTERY

CROSS-REFERENCE TO RELATED APPLICATION

This application claims priority to German Application No. DE 10 2021 210 585.8 filed on Sep. 23, 2021, the contents of which are hereby incorporated by reference in its entirety.

TECHNICAL FIELD

The present invention relates to a device for the filling and maintenance of a system with a battery, which is cooled by means of a coolant.

BACKGROUND

Heat generally occurs during operation and/or on charging of a battery. In particular in the case of high performances of the battery or respectively charging performances, a cooling of the battery is usually necessary here. For this purpose, batteries are usually a component of a system, wherein the battery is cooled in the system with the aid of a coolant. This requires a filling of the system with the coolant and, if applicable, a maintenance of the system.

The present invention is concerned with the problem of indicating an improved or at least different embodiment for the filling and maintenance of a system of the type named in the introduction, which is distinguished in particular by a simple implementation and/or improved handling.

This problem is solved according to the invention by the subject of the independent claim(s). Advantageous embodiments are the subject of the dependent claims.

SUMMARY

The present invention is based accordingly on the general idea of providing, for the filling and for the maintenance of a system in which a battery is cooled by means of a coolant, a device by which a filling of the system with coolant and a checking and cleaning of the coolant is carried out. The filling, the checking and the cleaning of the coolant are thus combined in the device. The result is a simplified implementation and a simplified and improved handling of the filling and the maintenance of the system.

In accordance with the idea of the invention, the device has two connections for fluidic connecting with the system for the purpose of the filling and maintenance of the system, which connections are also designated in the following as first device connection and second device connection. The device has, furthermore, an arrangement for the conveying of coolant, which is also designated in the following as conveying arrangement. Furthermore, the device has an arrangement by which the coolant can be analysed, wherein the arrangement is also designated in the following as analysis arrangement. In addition, the device has an arrangement for the checking of leakages of the system, which is also designated in the following as leakage-checking arrangement. The device has, furthermore, an arrangement for the cleaning of coolant, which is also designated in the following as cleaning arrangement. A control arrangement of the device is connected to the analysis arrangement, the leakage arrangement, the cleaning arrangement and the conveying arrangement in a communicating manner, and is configured for the filling, in particular for the first filling, and for the maintenance of the system.

For cooling the battery, a flow path of the coolant leads through the system, which is also designated in the following as system path. Expediently, for fluidic connection with the device, the system has two connections, which are also designated in the following as first system connection and second system connection. Here, for the filling and the maintenance of the system, the device connections are fluidically connected to the system connections. This means that the first device connection is connected to the first system connection, and the second device connection is connected to the second system connection.

The control arrangement is configured such that the device for filling the system with coolant for the first time, and thus for the first filling of the system in the case of a device connected to the system, checks the system path for leakages by means of the leakage-checking arrangement. In the case of absent leakage, therefore if no leakage is established, the device fills the system with coolant. The coolant originates here from a coolant reservoir. Subsequently, the device flushes the system with coolant, such that coolant circulates, in particular along the system path, through the system and through the device. On flushing, the device checks the quality of the coolant in the system by means of the analysis arrangement. In addition, the device cleans the coolant by means of the cleaning arrangement. The first filling is completed here when the quality of the coolant is sufficiently high, therefore lies above a predetermined value range.

The system, in particular the battery, can be used in any desired applications.

The system can be, in particular, a component of a motor vehicle, wherein the battery can serve for the drive of the motor vehicle, therefore in particular can be a traction battery.

The cooling of the battery with the coolant takes place advantageously by means of immersion cooling, also known as immersive cooling. Here, battery cells of the battery are immersed in the coolant and are flowed around by the coolant during operation. In immersion cooling, the quality of the coolant is important, in particular with regard to the electric conductivity. Accordingly, with such a cooling, a more frequent checking of the coolant and/or maintenance of the system is necessary. This can take place by means of the device according to the invention in a particularly simple manner, and reliably.

Expediently, the system has a heat exchanger for cooling the coolant. The system preferably has, in addition, a conveying arrangement, for example a pump, for conveying the coolant along the system path. Preferably, the system has, furthermore, a filter for filtering the coolant.

Embodiments are preferred, in which the device is formed as a unit. For this purpose, the device advantageously has a housing in which the analysis arrangement, the leakage-checking arrangement, the cleaning arrangement and the control arrangement are arranged together. The handling of the device is thus improved.

Particularly preferred here are embodiments in which the device, in particular the unit, is mobile. The device is preferably formed here as a carriage. For this purpose, at least one wheel and/or at least one roller is provided on the device, for example on the housing. In this way, the moving of the device towards the system, in particular to the motor vehicle, and away from the system, in particular from the motor vehicle, is simplified. This leads to an improved handling.

For the maintenance of the system, the device is connected to the system, as described.

For the maintenance of the system, the device advantageously checks the quality of the coolant in the system by means of the analysis arrangement. If the quality of the coolant is not sufficient, therefore the quality of the coolant is below the value range, the device flushes the system with coolant such that coolant circulates through the system along the system path and through the device. For this, expediently the conveying arrangement comes into use. During flushing, the device checks the quality of the coolant in the system by means of the analysis arrangement, and cleans the coolant by means of the cleaning arrangement. The maintenance is advantageously completed when the quality of the coolant in the system is sufficiently high, therefore lies above the predetermined value range.

It is conceivable, for the maintenance of the system, to at least partially draw on coolant from the coolant reservoir. This means that the coolant can be partially replaced or exchanged.

In preferred embodiments, the analysis arrangement is configured such that it determines a water content of the coolant for quality inspection. This means that the water content of the coolant is a parameter of the quality of the coolant. Advantageously, the water content of the coolant here is a component of the value range of the quality.

Alternatively or additionally, preferably additionally, the analysis arrangement is configured such that it determines an integrity of the coolant for quality inspection. This means that the integrity of the coolant is a parameter of the quality of the coolant. Advantageously, the integrity of the coolant is a component of the value range of the quality.

Integrity of the coolant is to be understood here to mean physical and/or chemical characteristics of the coolant. This preferably includes the electric conductivity of the coolant and/or the water content of the coolant. Thus it is prevented in particular that the coolant is electrically conductive such that undesired electric currents occur in the system, in particular in the battery, or such currents are at least reduced.

Embodiments are regarded as advantageous in which the cleaning arrangement is configured such that, for cleaning, it removes particles, in particular original dirt, from the coolant. In particular, the cleaning arrangement filters the coolant. For this purpose, the cleaning arrangement can have at least one filter.

In advantageous embodiments, the cleaning arrangement is configured such that it dehydrates the coolant for cleaning, therefore removes water from the coolant. For this purpose, the cleaning arrangement can have corresponding filters.

Embodiments are advantageous in which the cleaning arrangement is configured such that, for cleaning, it deionizes the coolant. This means that the cleaning arrangement is configured such that it neutralizes ions in the liquid or removes these from the liquid.

The checking of the leakage of the system can basically take place in any desired manner.

Advantageously, the leakage-checking arrangement for the checking of leakages of the system is configured on the basis of a positive pressure or negative pressure generated in the system. This permits a simplified and reliable checking for leakages. Accordingly, it is advantageous if the leakage-checking arrangement is configured such that for leakage checking it generates in the system path a negative pressure, in particular a vacuum, or a positive pressure.

Basically, the coolant reservoir can be a container separate from the device, in particular a tank which is able to be fluidically connected to the device.

Advantageously, the coolant reservoir is a component of the device, in particular of the carriage. This leads to a further simplified handling of the device and thus to a further simplification of the filling and of the maintenance of the system.

If, during the maintenance of the system, coolant arises which can not be delivered to the system and/or to the coolant reservoir due to poor quality, this coolant is preferably refreshed, therefore recycled.

It is conceivable here to carry out the recycling of the coolant by means of the device. In particular, it is conceivable to use the cleaning arrangement of the device for this purpose.

Further important features and advantages of the invention will emerge from the subclaims, from the drawings and from the associated FIGURE description with the aid of the drawings.

It shall be understood that the features mentioned above and to be explained further below are able to be used not only in the respectively indicated combination, but also in other combinations or in isolation, without departing from the scope of the present invention.

A preferred example embodiment of the invention is illustrated in the drawing and is explained more closely in the following description, wherein the same reference numbers refer to identical or similar or functionally identical components.

BRIEF DESCRIPTION OF THE DRAWINGS

The single FIG. 1 shows a highly simplified illustration, in the manner of a circuit diagram, of a system and of a device for the filling and maintenance of the system.

DETAILED DESCRIPTION

A device 1, as is shown by way of example in FIG. 1, serves for the filling and maintenance of a system 3 comprising a battery 2, as is shown by way of example in FIG. 1. The system 3 can be a component of a motor vehicle 4 which is otherwise not shown. In the motor vehicle 4, the battery 2 can serve for the drive. In operation of the system 3, the battery 2 is cooled with a coolant 5. In the example embodiment which is shown, the battery 2 is cooled by means of immersion cooling, also known as immersive cooling. For this purpose, battery cells 19 of the battery 2 are immersed (not shown) in the coolant 5 and are flowed around by the coolant 5. The coolant 5 flows here along a flow path 6 of the system 3, which is also designated as system path 6 in the following.

For the first filling, i.e. for the filling the first time, of the system 3 with coolant 5 and for the maintenance of the system 3, the device 1 has two connections 7, 8 for fluidic connecting with the system 3. The connections 7, 8 are also designated in the following as first device connection 7 and second device connection 8. For the first filling and for the maintenance, the device connections 7, 8 are connected to connections 9, 10 of the system 3 which are fluidically connected to the system path 6. The connections 9, 10 are also designated in the following as first system connection 9 and second system connection 10. For the first filling and maintenance of the system 3, the first device connection 7 is connected here to the first system connection 9 and the second device connection 8 is connected to the second system connection 10.

For the first filling and for the maintenance of the system 3, the device 1 has a conveying arrangement 11 for the conveying of coolant 5, an analysis arrangement 12 for analysing the coolant 5, a leakage-checking arrangement 13 for the checking of leakages, a cleaning arrangement 14 for the cleaning of coolant 5 and a control arrangement 15. The control arrangement 15 is connected in a communicating manner with the analysis arrangement 12, the leakage-checking arrangement 13 and the cleaning arrangement 14 and is configured for the first filling and maintenance of the system 3 described in the following.

For the first filling of the system 3, the system path 6 is firstly checked for leakages by means of the leakage-checking arrangement 13. When no leakage is established, with coolant 5 originating from a coolant reservoir 16, the system 3 is filled with coolant 5 and by means of the conveying arrangement 11. The system 3 is, furthermore, flushed with coolant 5 such that coolant 5 circulates along the system path 6 through the system 3 and through the device 1. During flushing and therefore during the circulation of the coolant 5, the quality of the coolant 5 in the system 3 is checked by means of the analysis arrangement 12. In addition, by means of the cleaning arrangement 14 a cleaning of the coolant 5 is carried out. The first filling is completed when the quality of the coolant 5 in the system 3 is sufficiently high, therefore lies above a predetermined value range.

In the example embodiment shown, the device 1 is configured as a unit. For this purpose, the analysis arrangement 12, the leakage-checking arrangement 13, the cleaning arrangement 14 and the control arrangement 15 are arranged in a shared housing 17 of the device. In addition, in the example embodiment shown, the device 1 is formed in a mobile manner as a carriage 18 and therefore, for the first filling and/or for maintenance, can be moved in a simplified manner to the system 3, in particular to the motor vehicle 4, and subsequently moved away. For this purpose, the device 1 has on the housing 17 at least one wheel 20 or a roller 21.

For the maintenance of the system 3, firstly the quality of the coolant 5 in the system 3 is checked by means of the analysis arrangement 12. If the quality is insufficient, therefore below the value range, the system 3 is flushed with coolant 5 by means of the conveying arrangement 11, such that coolant 5 circulates along the system path through the system 3 and through the device 1. Here, during flushing, the quality of the coolant 5 in the system 3 is checked by means of the analysis arrangement 12, and the coolant 5 is cleaned by means of the cleaning arrangement 14. If applicable, coolant 5 can be fed to the system 3 via the coolant reservoir 16. This means that the coolant 5 can be exchanged or partially replaced. The maintenance is completed when the quality of the coolant 5 in the system 3 is sufficiently high, therefore lies above the predetermined value range.

The quality of the coolant 5 can be reflected in at least one parameter of the coolant 5. This includes a water content of the coolant 5. Accordingly, the analysis arrangement 12 in the example embodiment shown is configured such that it determines the water content of the coolant 5 for quality inspection. The water content of the coolant 5 here is a component of the value range.

In the example embodiment shown, the quality of the coolant 5 is reflected in addition in the integrity of the coolant 5. This includes physical characteristics such as the electric conductivity of the coolant 5 and/or chemical characteristics such as the hydrogen content of the coolant 5. Consequently, the analysis arrangement 12 is configured such that it determines the chemical integrity of the coolant 5 for quality inspection. Here, the integrity of the coolant 5 is a component of the value range.

In the example embodiment shown, the cleaning arrangement 14 is configured such that it can improve the said quality parameters. Accordingly, the cleaning arrangement 14 is configured such that, for cleaning, it dehydrates and/or deionizes and/or dewaters the coolant 5. In the example embodiment shown, the cleaning arrangement 14 is, in addition, configured such that, for cleaning, it removes particles, in particular original dirt, from the coolant 5, therefore filters the coolant 5.

The checking of the system 3 for leakages by means of the leakage-checking arrangement 13 can take place by the generating of a negative pressure or a positive pressure in the system 3, in particular in the system path 6. For this purpose, in the example embodiment shown, the leakage-checking arrangement 13 is configured such that for leakage-checking in the system path 6 it generates a negative pressure, in particular a vacuum, or a positive pressure. The leakage-checking arrangement 13 can replace the conveying arrangement 11 here. The negative pressure or the positive pressure in the system 3, in particular in the system path 6, can therefore be generated by means of the conveying arrangement 11.

As can be seen from FIG. 1, in the example embodiment shown, the coolant reservoir 16 is a component of the device 1 and therefore of the carriage 18. Here, the coolant reservoir 16 is arranged externally on the housing 17.

With the device 1, a simple and reliable first filling and maintenance of systems 3 and a simple handling are possible.

In the example embodiment shown, the system 3 has, in addition to the battery 2, a fluid management module 22 for controlling the flows of the coolant 5 and for cooling the coolant 5. The fluid management module 22 is arranged here outside the battery 2 and has the system connections 9, 10. In the example embodiment shown, the fluid management module 22 has a conveying arrangement 22 for conveying the coolant 5, which is also designated in the following as system conveying arrangement 23. In addition, the fluid management module 22 has a heat exchanger 24 for cooling the coolant 5. In the example embodiment shown, the heat exchanger 24 is integrated in a cooling circuit 25, indicated and fluidically separated from the system path 6. Furthermore, the fluid management module 22 has a filter 26 for the filtering of coolant 5. In the example embodiment shown, an associated bypass 27 leads respectively past the heat exchanger 24 and the filter 26. This means that a bypass 27a leads past the heat exchanger 24 and a bypass 27b leads past the filter 26. In the example embodiment shown, the fluid management module 22 has, in addition, a temperature regulator 28, arranged in the bypass 27a, and a bypass valve 29 arranged in the bypass 27b. In addition, in the example embodiment shown, upstream of the filter 26 a temperature sensor 30 is arranged, and a pressure sensor 31 is arranged between the filter 26 and the heat exchanger 24.

The invention claimed is:

1. A device for filling and maintenance of a system including a battery where, in operation of the system, the battery is cooled by a coolant that flows along a system path of the system, the device comprising:
  a fluidic first device connection for connecting to a first system connection of the system, fluidically connected to the system path, and a fluidic second device connection for connecting to a second system connection of the system,
  a conveying device for conveying the coolant, an analysis arrangement for analysing the coolant, a leakage-checking arrangement for checking leakages, a cleaning arrangement for cleaning the coolant, and a control arrangement, wherein the control arrangement is configured such that with the device connected to the system for a first filling of the system with the coolant, the control arrangement:

checks the system path for leakages via the leakage-checking arrangement, in the absence of leakage, fills the system with the coolant via a coolant reservoir, flushes the system with the coolant such that the coolant circulates along the system path through the system and the device, checks a quality of the coolant in the system via the analysis arrangement during flushing, and cleans the coolant via the cleaning arrangement, and completes the first filling when the quality lies above a predetermined value range.

2. The device according to claim 1, wherein the analysis arrangement, the leakage-checking arrangement, the cleaning arrangement and the control arrangement are arranged in a shared housing.

3. The device according to claim 2, wherein the device is structured as a mobile carriage.

4. The device according to claim 1, wherein the control arrangement is configured such that, with device connected to the system for the maintenance of the system, the control arrangement:

checks the quality of the coolant in the system via the analysis arrangement, in the case where the quality of the coolant lies below the predetermined value range:

flushes the system with the coolant, such that the coolant circulates through the system and the device, checks the quality of the coolant in the system via the analysis arrangement during flushing, and cleans the coolant via the cleaning arrangement, and completes the maintenance when the quality lies above the predetermined value range.

5. The device according to claim 1, wherein the analysis arrangement is configured such that, for quality inspection, the analysis arrangement determines a water content of the coolant.

6. The device according to claim 1, wherein the analysis arrangement is configured such that, for quality inspection, the analysis arrangement determines a chemical integrity of the coolant.

7. The device according to claim 1, wherein the cleaning arrangement is structured such that, for cleaning, the cleaning arrangement removes particles from the coolant.

8. The device according to claim 1, wherein the cleaning arrangement is structured such that, for cleaning, the cleaning arrangement at least one of dehydrates and deionizes the coolant.

9. The device according to claim 1, wherein the leakage-checking arrangement is configured such that, for leakage-checking, the leakage-checking arrangement generates in the system path a negative pressure or a positive pressure.

10. The device according to claim 1, wherein the coolant reservoir is a component of the device.

11. A system, comprising:

a battery that, during operation of the system, is cooled by a coolant that flows along a system path;

a first system connection fluidically connected to the system path;

a second system connection;

a device for filling and maintenance of the system, the device including:

a fluidic first device connection for connecting to the first system connection and a fluidic second device connection for connecting to the second system connection;

a conveying device for conveying the coolant, an analysis arrangement for analysing the coolant, a leakage-checking arrangement for checking for leakages, a cleaning arrangement for cleaning the coolant, and a control arrangement;

wherein the control arrangement is configured such that with the device connected to the system for a first filling of the system with the coolant, the control arrangement:

checks the system path for leakages via the leakage-checking arrangement;

in the absence of a leakage, fills the system with the coolant via a coolant reservoir;

flushes the system with the coolant such that the coolant circulates along the system path through the system and the device;

checks a quality of the coolant in the system via the analysis arrangement during flushing, and cleans the coolant via the cleaning arrangement; and completes the first filling when the quality lies above a predetermined value range.

12. The system according to claim 11, wherein the analysis arrangement, the leakage-checking arrangement, the cleaning arrangement, and the control arrangement are arranged in a shared housing.

13. The system according to claim 12, wherein the device is structed as a mobile carriage.

14. The system according to claim 11, wherein the control arrangement is configured such that, with the device connected to the system for the maintenance of the system, the control arrangement:

checks the quality of the coolant in the system via the analysis arrangement;

in the case where the quality of the coolant lies below the predetermined value range:

flushes the system with the coolant, such that the coolant circulates through the system and the device;

checks the quality of the coolant in the system via the analysis arrangement during flushing, and cleans the coolant via the cleaning arrangement; and completes the maintenance when the quality lies above the predetermined value range.

15. The system according to claim 11, wherein the analysis arrangement is configured such that, for quality inspection, the analysis arrangement determines a water content of the coolant.

16. The system according to claim 11, wherein the analysis arrangement is configured such that, for quality inspection, the analysis arrangement determines a chemical integrity of the coolant.

17. The system according to claim 11, wherein the cleaning arrangement removes particles from the coolant for cleaning the coolant.

18. The system according to claim 11, wherein the cleaning arrangement at least one of dehydrates and deionizes the coolant for cleaning.

19. The system according to claim 11, wherein the leakage-checking arrangement is configured such that, for leakage-checking, the leakage-checking arrangement generates a negative pressure or a positive pressure in the system path.

20. The system according to claim 11, wherein the coolant reservoir is a component of the device.

* * * * *